O. H. JEWELL.
APPARATUS FOR MAKING ARTIFICIAL ICE.
APPLICATION FILED APR. 8, 1908.

965,583.

Patented July 26, 1910.
4 SHEETS—SHEET 1.

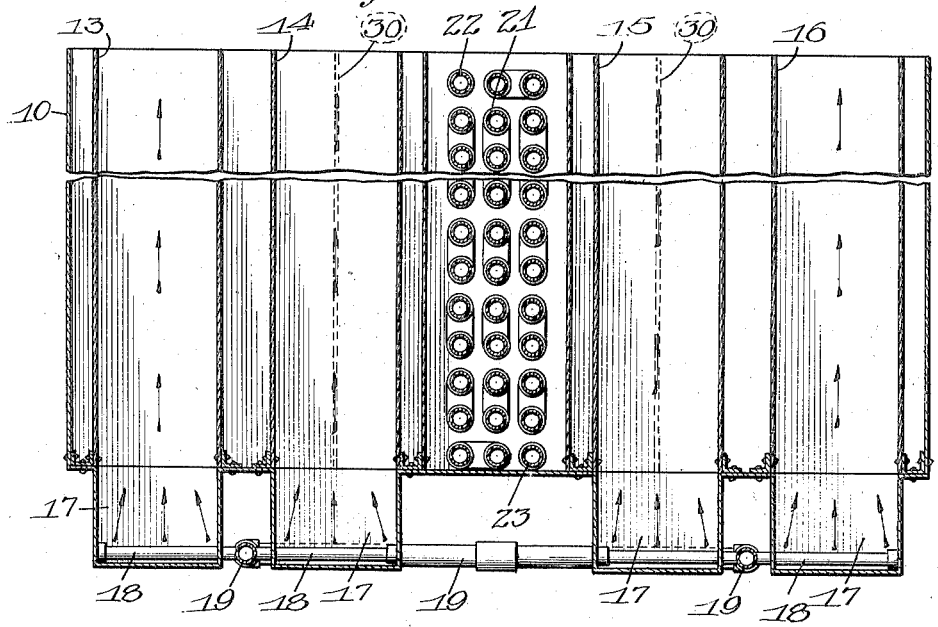
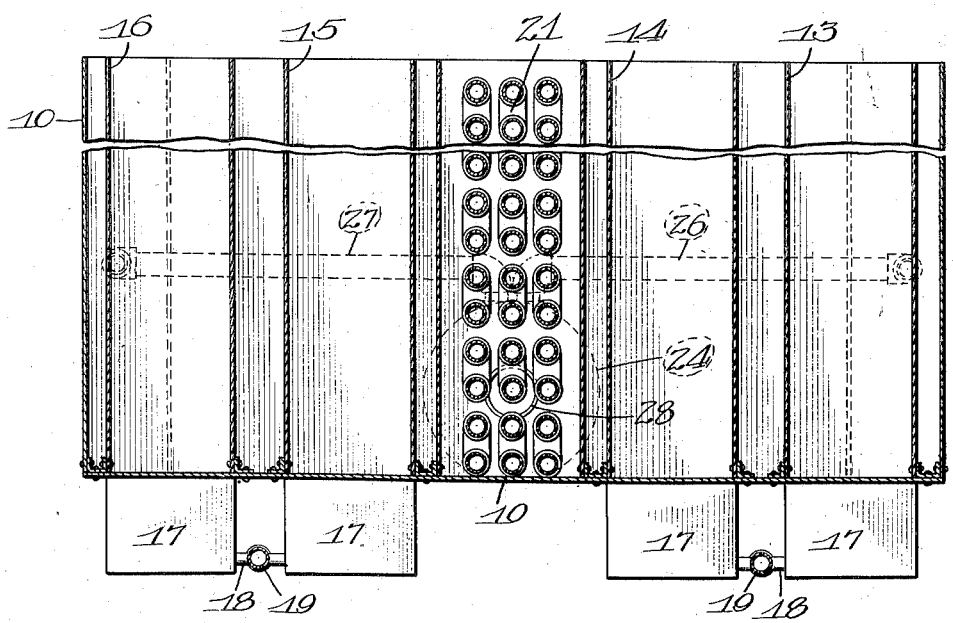

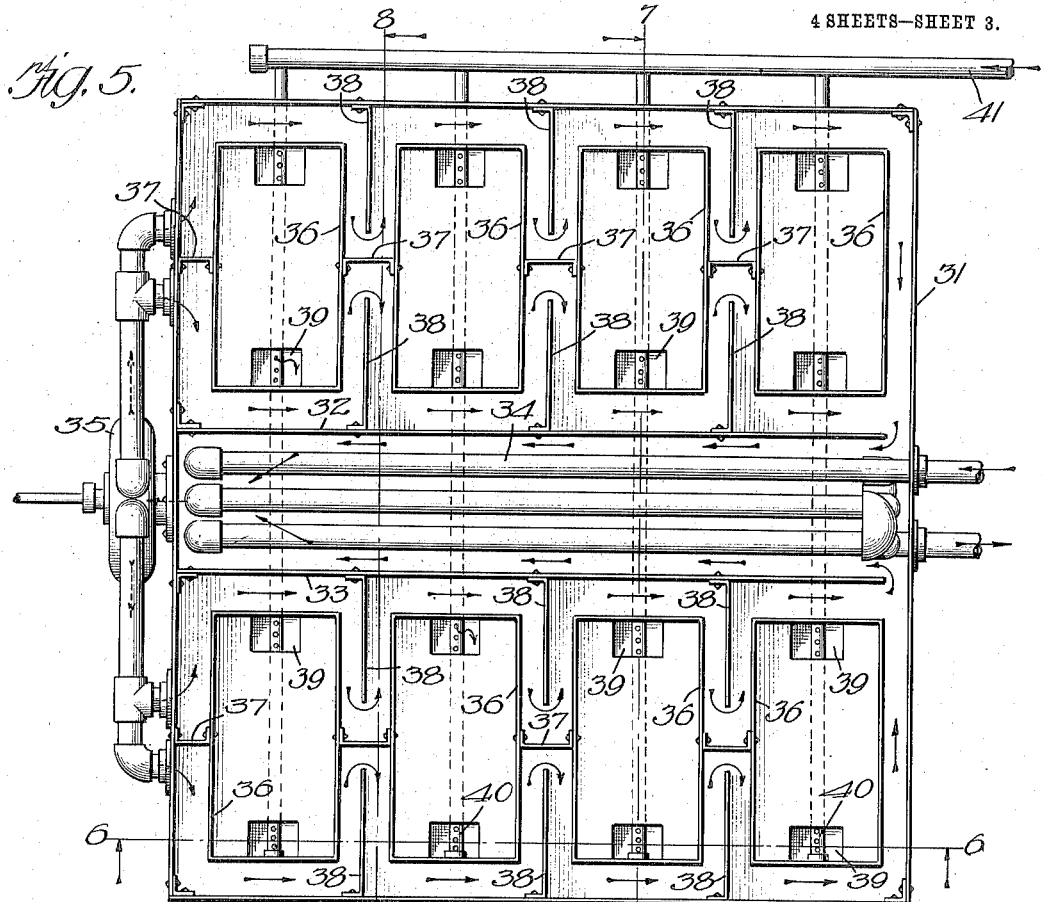
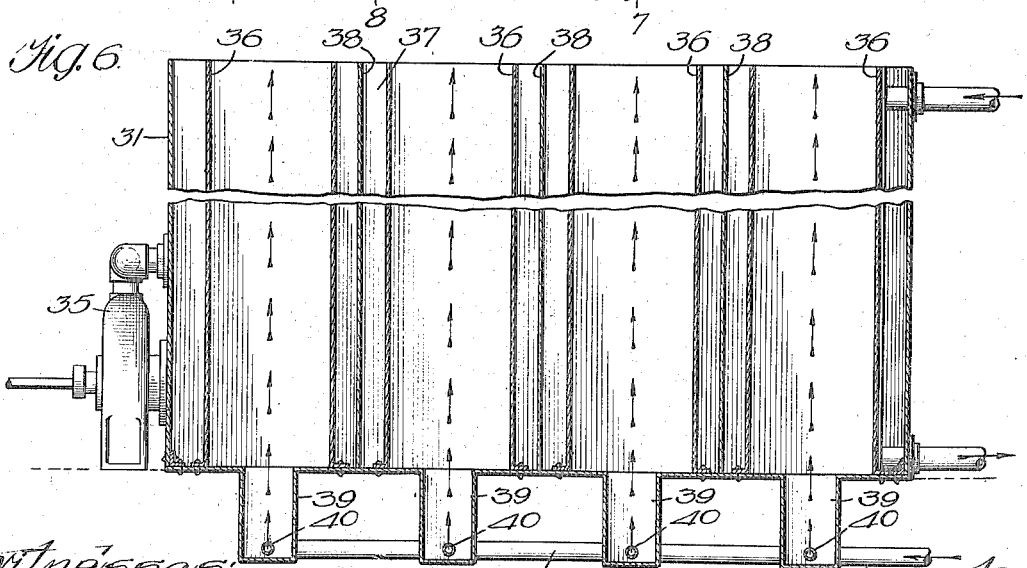

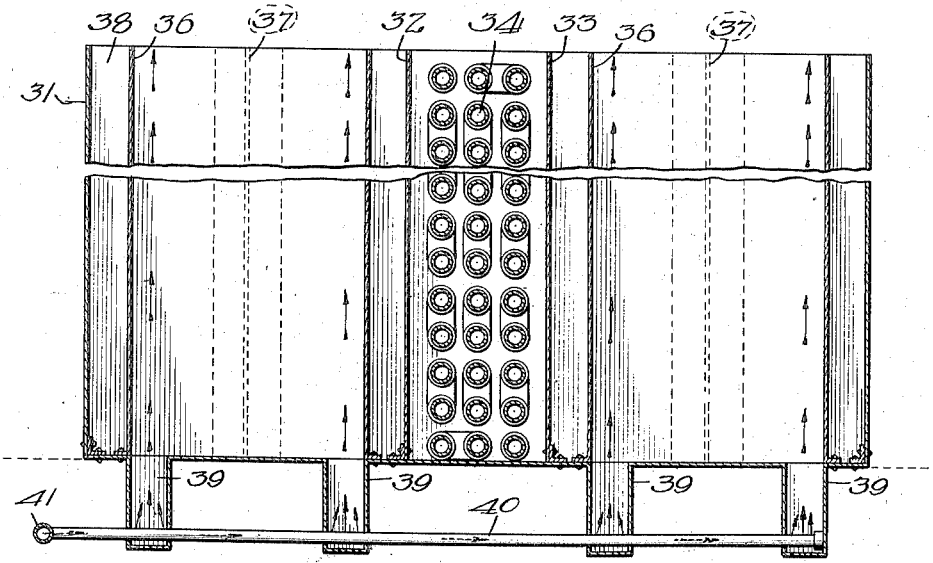
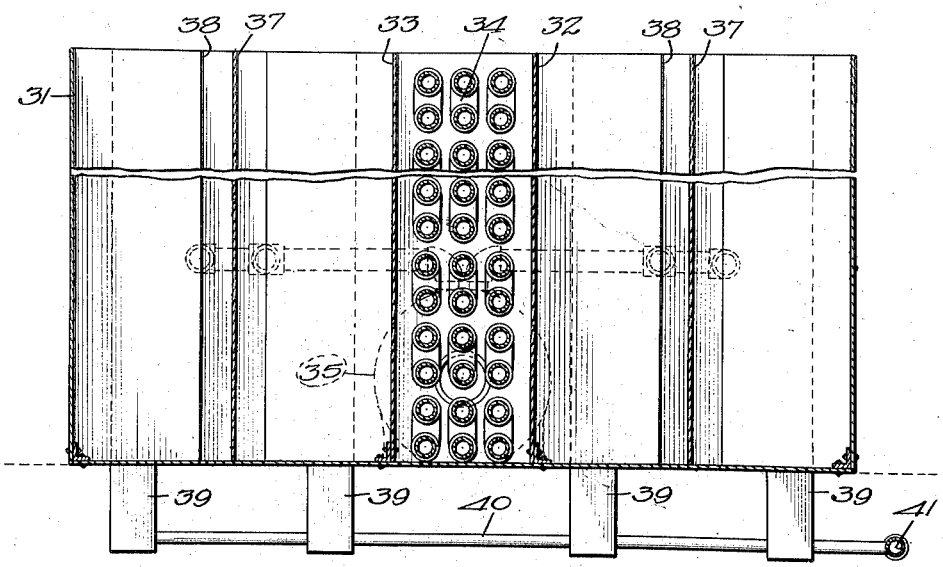
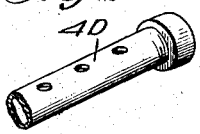

UNITED STATES PATENT OFFICE.

OMAR H. JEWELL, OF CHICAGO, ILLINOIS, ASSIGNOR TO POLAR ICE MACHINE COMPANY, OF CHICAGO, ILLINOIS, A CORPORATION OF ILLINOIS.

APPARATUS FOR MAKING ARTIFICIAL ICE.

965,583.      Specification of Letters Patent.    Patented July 26, 1910.

Application filed April 8, 1908. Serial No. 425,878.

*To all whom it may concern:*

Be it known that I, OMAR H. JEWELL, a citizen of the United States, residing at Chicago, in the county of Cook and State of Illinois, have invented a new and Improved Apparatus for Making Artificial Ice, of which the following is a specification, reference being had to the accompanying drawings.

My invention relates to the art of making artificial ice and, generically considered, has to do with the manufacture of ice by causing the water to be frozen, while in a suitable container, to freeze toward a portion of the container where the water is maintained in an unfrozen condition, the water being meanwhile agitated to keep the impurities therein free from entanglement with the forming ice crystals and permit them to remain separate from the mass of ice. Pure and clear ice may in this way be made from raw water without the use of heat or chemical reagents for purification purposes. Heretofore it has been proposed to agitate the water for the purpose stated by means of mechanical agitators, but the use of such agitators is objectionable, and it is one of the objects of my present invention to provide an improved apparatus by which the use of such mechanical agitators is avoided without in any way impairing its efficiency.

A further object is to provide for freezing blocks of ice of commercial size in containers large enough to permit of freezing a number of such blocks at one time, meanwhile securing all the advantages of the process hereinbefore referred to.

I accomplish these objects as illustrated in the accompanying drawings and as hereinafter described.

What I regard as new is set forth in the claims.

Figure 1:
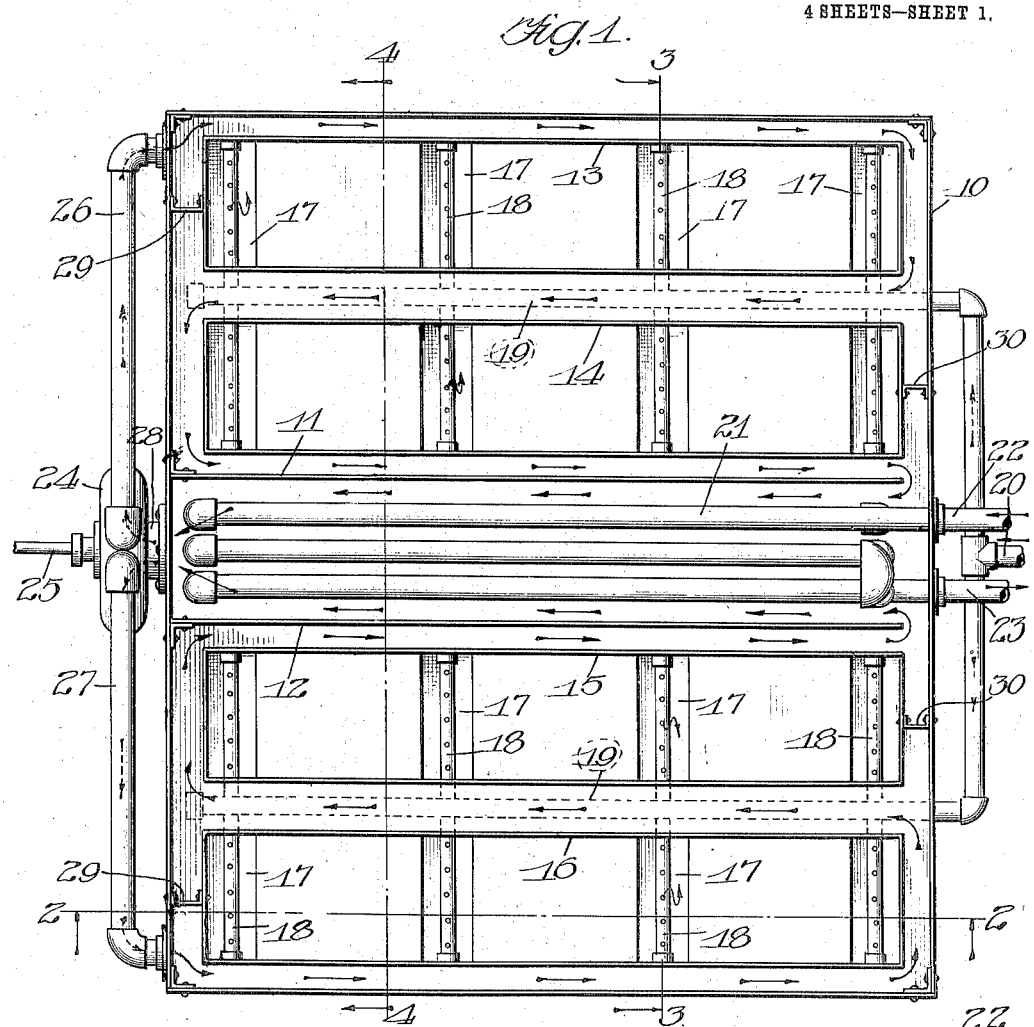
Figure 2:
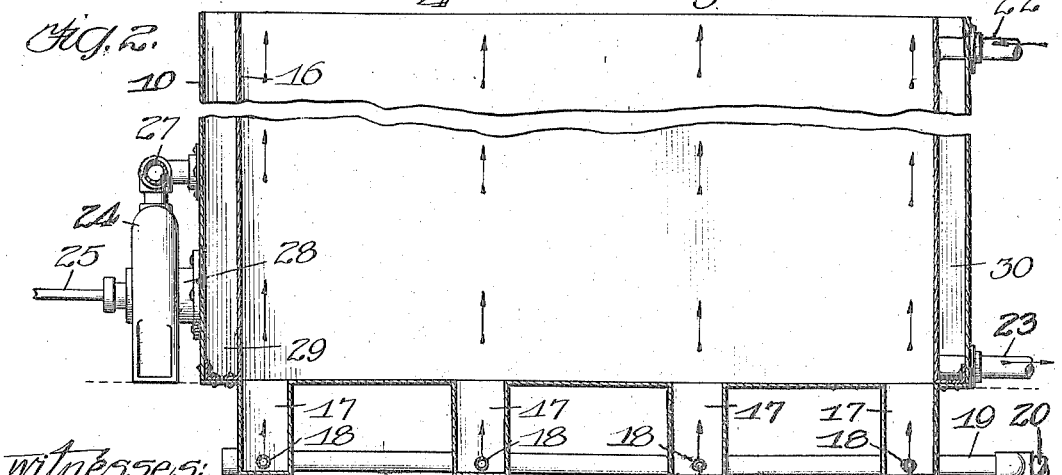

In the accompanying drawings,—Figure 1 is a plan view, illustrating one form of my improved apparatus; Fig. 2 is a longitudinal vertical section thereof on line 2—2 of Fig. 1; Fig. 3 is a section on line 3—3 of Fig. 1; Fig. 4 is a section on line 4—4 of Fig. 1; Fig. 5 is a plan view, showing certain features of my invention applied to smaller receptacles each adapted to contain sufficient water to form a block of ice of commercial size; Fig. 6 is a section on line 6—6 of Fig. 5; Fig. 7 is a section on line 7—7 of Fig. 5; Fig. 8 is a section on line 8—8 of Fig. 5; and Fig. 9 is a perspective view, showing one end portion of one of the air inlet pipes.

The method which the apparatus illustrated is designed to carry out, consists in causing the water to be frozen, while in a suitable container, to freeze toward a side or portion thereof where the water is maintained in an unfrozen condition, meanwhile agitating the water by causing currents of air to pass upward through the water adjacent to that portion of the container which is maintained at a non-freezing or relatively non-freezing temperature. Such method also includes the introduction of air into the bottom of an elongated receptacle at intervals, thereby establishing zones in the receptacle which have the effect of keeping unfrozen the water in such zones and in that way secure the freezing of the water in the receptacle into a series of separate or substantially separate blocks of ice,—the result being that a plurality of separate blocks of ice are produced in a single continuous receptacle having no partitions or division plates.

Referring now to the drawings for a description of the apparatus therein shown,—10 indicates a tank adapted to contain the several parts of the apparatus and also to serve as a receptacle for brine or other freezing liquid. Said tank is made of any suitable material and is preferably rectangular in shape and is provided near the inner end with two partitions 11—12 preferably arranged in parallelism, which are connected with the walls of the tank at the bottom and one end only, thus serving as baffle-plates to direct the circulation of the brine in the tank.

13—14—15—16 indicate four tanks adapted to contain the water to be frozen. These tanks—which for convenience I shall term the ice tanks—as shown in Fig. 1, are rectangular in shape and are elongated, being several times as long as they are wide. Said tanks are of a width equal to the thickness of a commercial cake of ice and as illustrated are about four times as long as the width of such cake of ice. Two of such tanks are preferably provided at each end of the tank,—that is to say, between each of the partitions 11—12 and the adjacent end of the tank 10. Said tanks 13—14—15—16 are set a distance apart from the side and end walls of the tank 10 so that brine may freely circulate around them, but the bottoms of said tanks are exposed to a non-freezing temperature, as clearly shown in Fig. 2. As best shown in Figs. 1 and 2, each of said tanks 13 to 16 is provided at the bottom with a series of transverse traps or troughs 17, one of said troughs being provided at each end of each of said tanks, the other two being placed intermediately and equi-distant apart,—the distance separating the several troughs being substantially equal to the width of a commercial cake of ice. The troughs are open at the top, as shown in Fig. 2, and are provided with transverse pipes 18 which are perforated preferably at the top, as shown in Fig. 9, to permit the escape of air therefrom. Said pipes 18 are branches of main pipes 19 which connect with an air pipe 20, as shown in Fig. 1. By this arrangement air may be admitted to the several troughs 17 and may then enter the several tanks 13, 14, 15 and 16 at the bottom and rise through them. It will be noted that as the pipes 17 extend transversely of the several ice tanks the air escaping from them will rise in vertical planes or zones through the water in the ice tanks and consequently cause the water in said tanks to circulate. Moreover, the air being warmer than the brine will serve to keep the water adjacent to such zones warmer than the remainder of the water in the ice tanks and consequently keep unfrozen the water in such zones, the result being that the operation of freezing will progress toward such zones, beginning at the sides of the ice tanks which are directly exposed to the brine as hereinafter described.

21 indicates a series of ammonia pipes connected with an inlet pipe 22 and an outlet pipe 23 so that ammonia may circulate therethrough. The arrangement is such that by causing the ammonia, or other freezing medium, to flow through the coil of pipes 21 the brine may be reduced to the proper temperature to effect the freezing of the water contained in the several ice tanks.

The brine in the tank 10 is caused to circulate by means of a pump 24, preferably of the centrifugal type and driven from any suitable source of power, as by a shaft 25,—said pump being connected with the end portions of the tank 10 by pipes 26—27 through which brine reënters said tank and by a pipe 28 through which the brine is drawn into the pump. Partitions 29 are provided adjacent to the openings of the pipes 26—27 into the tank 10, as shown in Fig. 1, to compel the brine to properly flow through said tank. Also partitions 30 are provided at the opposite side of the tank for the same purpose,—the object being to provide a circuitous path which the brine must follow so as to properly subject all parts of the ice tanks to the influence of the freezing medium.

In operation the air is admitted to the ice tanks in the transverse zones described while the water in said tanks is subjected to the action of the cold brine, the result, as has already been suggested, being that ice is first caused to form next to the sides of the ice tanks, the formation of ice gradually progressing toward the centers of said tanks and also toward the warmer zones in which the air admitted through the transverse pipes 18 rises. During the freezing operation the water is caused to circulate by the passage of the air therethrough, thereby maintaining sufficient movement therein to prevent the impurities separated from the water lodging in the forming mass of ice or becoming entangled with the ice crystals. The operation continues until the ice cakes have attained to a sufficient size when the circulation of the brine is stopped and the ice cakes removed. The operation is not carried far enough to permit the cakes of ice in any one tank to unite, except perhaps to a limited extent,—the object being to preserve unfrozen zones between the several blocks or cakes in which the impurities may be accumulated.

In the construction shown in Figs. 5 to 8 I have illustrated an apparatus which embodies many of the features employed in the earlier figures, but differs therefrom in that the cakes of ice are frozen in separate receptacles. In the construction therein shown I provide a brine tank 31 which is similar to the tank 10 and is in like manner provided with partitions 32—33, with an ammonia coil 34 and a pump 35 for causing the brine to circulate. Instead, however, of employing the long ice tanks arranged to contain a plurality of blocks of ice, I provide two series of small tanks 36 each of a size adapted to contain a single block of ice, said tanks being connected by partitions 37, as shown in Fig. 5. Baffle-plates 38 are also provided to direct the flow of brine around the several ice tanks.

The bottoms of the several tanks 36 are exposed to a non-freezing temperature and are provided with pockets 39 at each end, as shown in Figs. 5 and 6, and said pockets are provided with air pipes 40 for discharging air thereinto, said pipes being connected with main pipes 41, as shown in Figs. 6 and 7. By this arrangement the water in the end portions of the several tanks 36 is kept agitated and in an unfrozen condition with the results already described.

That which I claim as my invention and desire to secure by Letters Patent is,—

1. An apparatus for making artificial ice, comprising a suitable container adapted to receive the water to be frozen, means at the sides of said container adapted to contain a freezing medium, a receptacle below said container, said receptacle being open at the top and lying in a plane below that of the freezing medium, and means for introducing air into said receptacle.

2. An apparatus for making artificial ice, comprising a suitable container adapted to receive the water to be frozen, means at the sides of said container adapted to contain a freezing medium, a plurality of receptacles arranged at intervals below said container, said receptacles being open at the top and lying in a plane below that of the freezing medium, and means for introducing air into said receptacle or receptacles.

3. An apparatus for making artificial ice, comprising a suitable container adapted to receive the water to be frozen, means at the sides of said container adapted to contain a freezing medium, a plurality of receptacles arranged at intervals below said container, said receptacles being open at the top and lying in a plane below that of the freezing medium, and an external air pipe for introducing air into said receptacle or receptacles.

OMAR H. JEWELL.

Witnesses:
JOHN L. JACKSON,
MINNIE A. HUNTER.